US012585309B2

(12) United States Patent
Wang et al.

(10) Patent No.: US 12,585,309 B2
(45) Date of Patent: Mar. 24, 2026

(54) LAPTOP COMPUTER WITH QUICK-RELEASE KEYBOARD

(71) Applicant: Acer Incorporated, New Taipei City (TW)

(72) Inventors: Wei-Chih Wang, New Taipei City (TW); Chen-Min Hsiu, New Taipei City (TW); Chih-Wei Liao, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 158 days.

(21) Appl. No.: 18/418,353

(22) Filed: Jan. 22, 2024

(65) Prior Publication Data

US 2025/0060793 A1 Feb. 20, 2025

(30) Foreign Application Priority Data

Aug. 18, 2023 (TW) .................................. 112131146

(51) Int. Cl.
*G06F 1/16* (2006.01)

(52) U.S. Cl.
CPC .......... *G06F 1/1669* (2013.01); *G06F 1/1616* (2013.01); *G06F 1/1656* (2013.01)

(58) Field of Classification Search
CPC .................................................... G06F 1/1669
See application file for complete search history.

(56) References Cited

U.S. PATENT DOCUMENTS

| | | | | |
|---|---|---|---|---|
| 5,483,418 A * | 1/1996 | Hosoi | ................... | G06F 1/1662 |
| | | | | 361/679.55 |
| 5,490,037 A * | 2/1996 | Clancy | .................. | G06F 1/1616 |
| | | | | 361/679.55 |
| 5,969,644 A * | 10/1999 | Koutaka | .............. | H01H 13/702 |
| | | | | 400/472 |
| 6,751,089 B2 * | 6/2004 | Hsieh | .................... | G06F 1/1616 |
| | | | | 361/747 |
| 7,447,008 B2 * | 11/2008 | Wang | ...................... | H04M 1/23 |
| | | | | 361/679.55 |
| 7,643,278 B2 * | 1/2010 | Hou | ....................... | G06F 1/1616 |
| | | | | 361/679.17 |
| 8,050,020 B2 * | 11/2011 | Liu | ........................ | G06F 1/1662 |
| | | | | 361/679.17 |
| 8,132,975 B2 * | 3/2012 | Tracy | .................... | G06F 1/1616 |
| | | | | 400/693 |
| 10,353,437 B1 * | 7/2019 | Kitamura | .............. | G06F 1/1669 |

(Continued)

FOREIGN PATENT DOCUMENTS

| | | |
|---|---|---|
| CN | 2821653 | 9/2006 |
| CN | 116382425 | 7/2023 |

*Primary Examiner* — Adrian S Wilson
(74) *Attorney, Agent, or Firm* — JCIPRNET

(57) ABSTRACT

A laptop computer with a quick-release keyboard including a host, a display, and a keyboard is provided. The host has a first surface and a second surface opposite to each other. The host has at least one movable hook disposed on the first surface. The display is pivoted to the host to be folded or unfolded relative to the first surface of the host. The laptop computer is supported on a platform via the second surface when the display is unfolded relative to the first surface of the host. The keyboard has a locking column to be locked by the movable hook when the keyboard is disposed on the first surface, such that the keyboard is fixed on the first surface.

9 Claims, 8 Drawing Sheets

(56) References Cited

U.S. PATENT DOCUMENTS

| | | | | |
|---|---|---|---|---|
| 10,429,900 B1* | 10/2019 | Kitamura | ............... | H01H 13/86 |
| 2007/0033972 A1* | 2/2007 | Wang | ...................... | H04M 1/23 |
| | | | | 70/358 |
| 2008/0144262 A1* | 6/2008 | Lai | ........................ | G06F 1/1662 |
| | | | | 361/679.17 |
| 2010/0039761 A1* | 2/2010 | Wang | ................... | G06F 1/1669 |
| | | | | 361/679.17 |
| 2010/0149741 A1* | 6/2010 | Liu | ....................... | G06F 1/1613 |
| | | | | 361/679.08 |

* cited by examiner

LAPTOP COMPUTER WITH QUICK-RELEASE KEYBOARD

CROSS-REFERENCE TO RELATED APPLICATION

This application claims the priority benefit of Taiwan application serial no. 112131146, filed on Aug. 18, 2023. The entirety of the above-mentioned patent application is hereby incorporated by reference herein and made a part of this specification.

BACKGROUND

Technical Field

The disclosure relates to a laptop computer, and in particular to a laptop computer with a quick-release keyboard.

Description of Related Art

With the advancement of technology, computers have gradually become smaller, evolving from desktop computers to portable laptop computers.

In the laptop computers of the existing technology, the disassembling and assembling of a keyboard has always been a cumbersome and complicated procedure, which usually involves removing the screws from the bottom of the host to initially remove the bottom case, and removing the relevant components in the host in sequence. The keyboard is successfully removed from the inside of the top casing of the host only after removing the components that block the keyboard. On the other hand, once the keyboard replacement or repair is completed, the above steps need to be performed again in reverse to complete the assembly operation of the host.

Although a better locking force may be obtained by using a screw locking manner, the locking and disassembly thereof are extremely inconvenient. Whether the repair operation is performed by the user or the operator in production lines, the work requires a lot of labor and is time-consuming.

SUMMARY

The disclosure provides a laptop computer with a quick-release keyboard. Through a locking column, the keyboard may be disassembled and assembled from the outside of a host.

A laptop computer with a quick-release keyboard according to an embodiment of the disclosure includes the host, a display, and a keyboard. The host has a first surface and a second surface opposite to each other. The host has at least one movable hook disposed on the first surface. The display is pivoted to the host to be folded or unfolded relative to the first surface of the host. The laptop computer is supported on a platform via the second surface when the display is unfolded relative to the first surface of the host. The keyboard has the locking column to be locked by the movable hook when the keyboard is disposed on the first surface, such that the keyboard is fixed on the first surface.

Based on the above, the host of the laptop computer has the first surface and the second surface opposite to each other. The second surface is used as a supporting surface when placed on the platform. The display is folded or unfolded relative to the first surface. The keyboard may be directly locked or released with the movable hook on the first surface through the locking column on the bottom surface. In this way, the keyboard of the laptop computer may be disassembled and assembled from the outside of the host without disassembling the host, thereby providing a simple and convenient assembly process.

DESCRIPTION OF THE EMBODIMENTS

Figure 1:
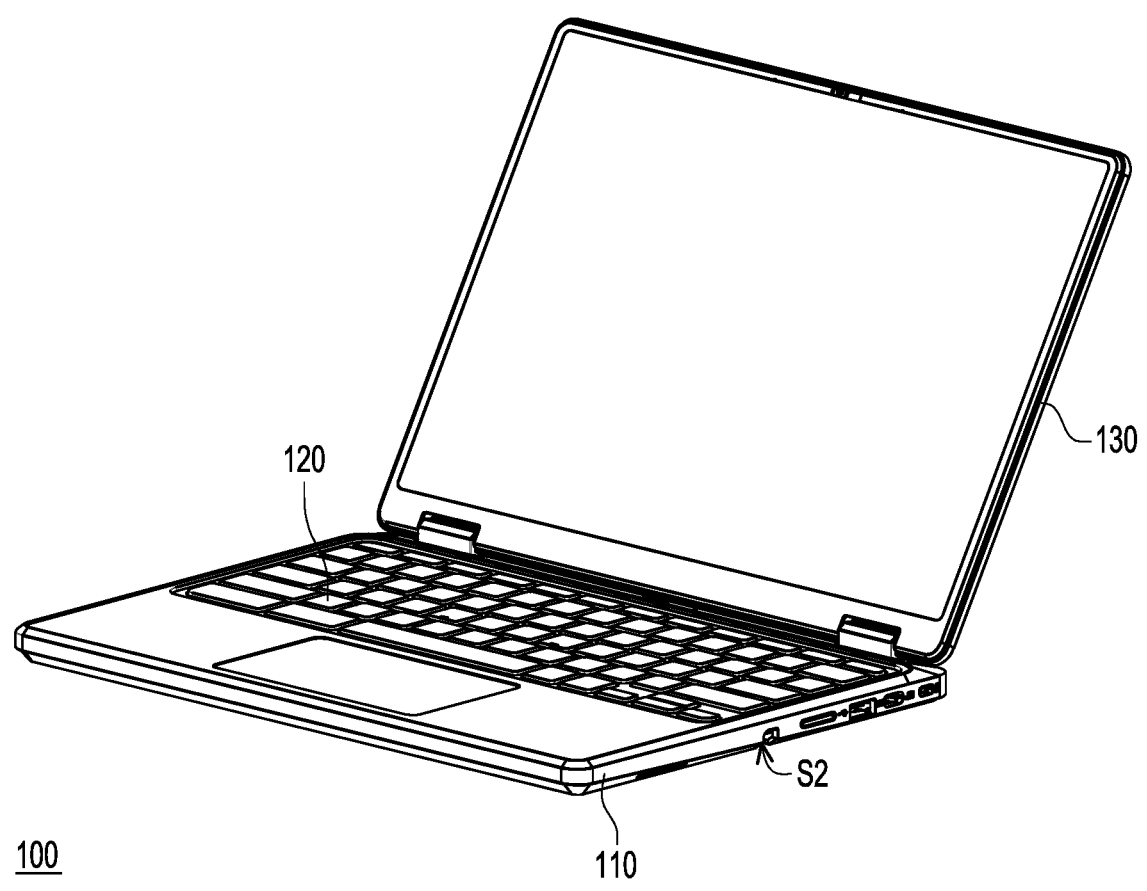
FIG. 1 is a schematic view of a laptop computer according to an embodiment of the disclosure.
Figure 2A:
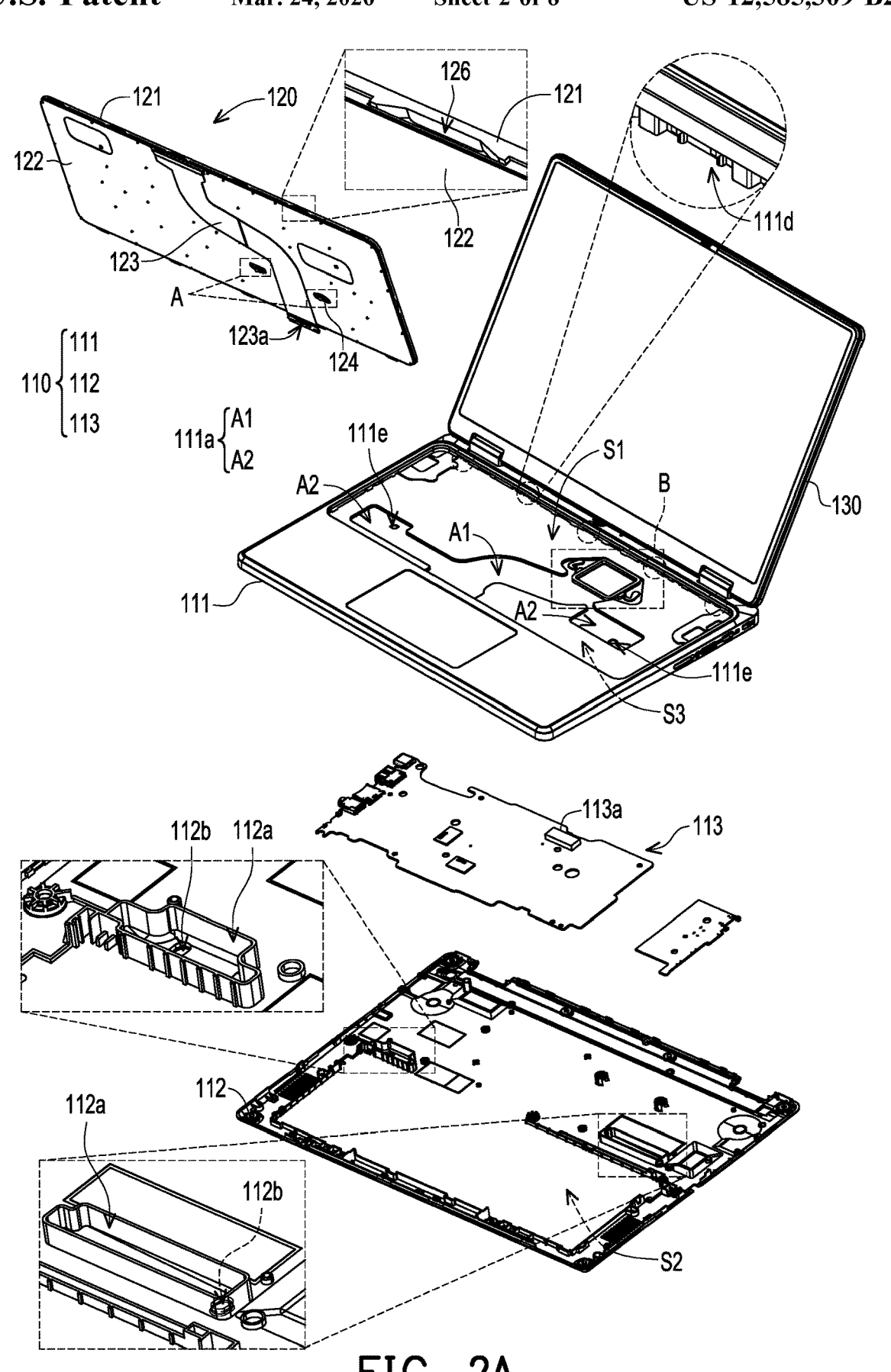
FIG. 2A is an exploded schematic view of the laptop computer in FIG. 1.

FIG. 1 is a schematic view of a laptop computer according to an embodiment of the disclosure. FIG. 2A is an exploded schematic view of the laptop computer in FIG. 1. Referring to FIG. 1 and FIG. 2A, in this embodiment, a laptop computer 100 with a quick-release keyboard (hereinafter referred to as the laptop computer 100) includes a host 110, a display 130 and a keyboard 120. The host 110 has a first surface S1 and a second surface S2 opposite to each other. The display 130 is pivoted to the host 110 to be pivoted relative to the host 110 and be folded or unfolded relative to the first surface S1 of the host 110. The laptop computer 100 is adapted to be supported on a platform (not shown) via the second surface S2 when the display 130 is unfolded relative to the first surface S1.

Figure 2B:
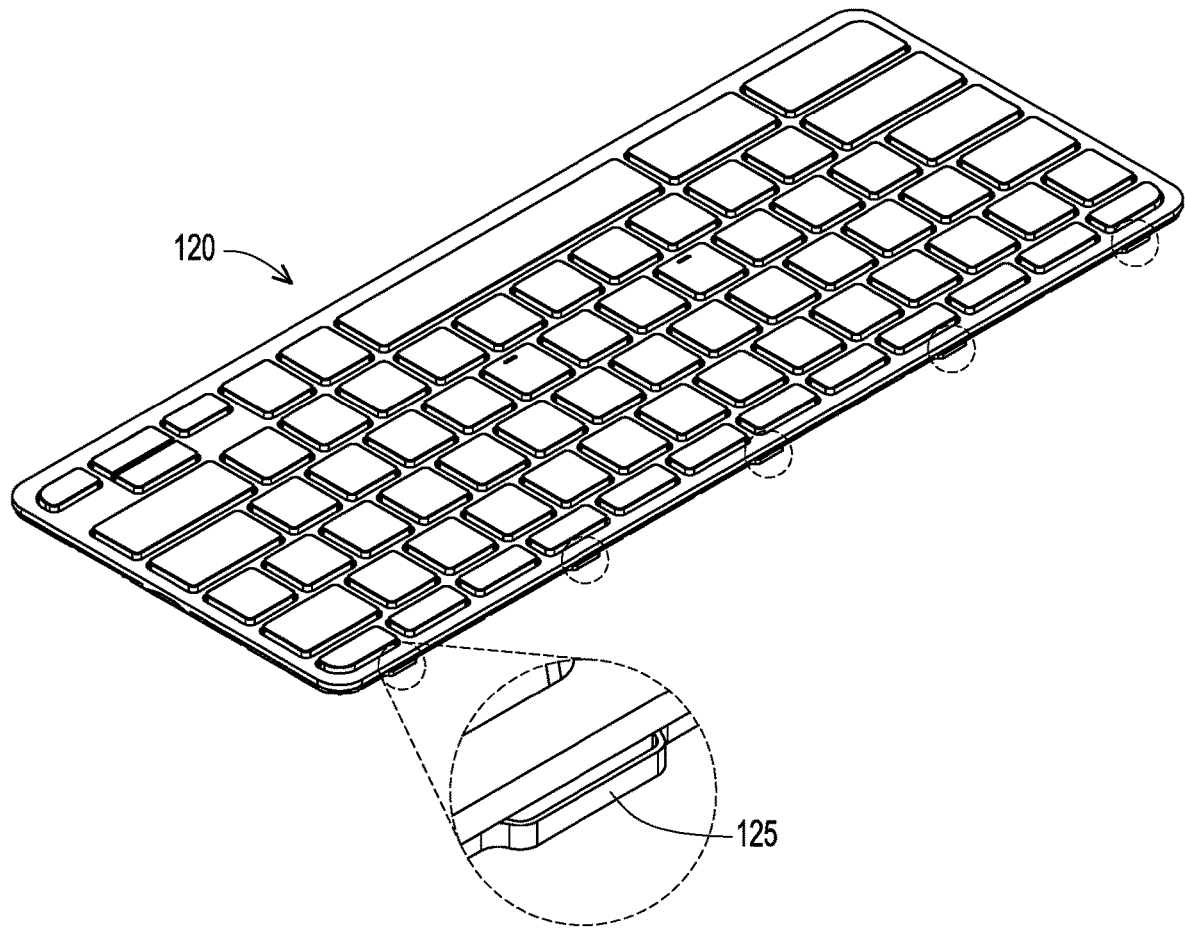
FIG. 2B to FIG. 2F are enlarged views of multiple parts of the laptop computer of FIG. 2A.
Figure 2C:
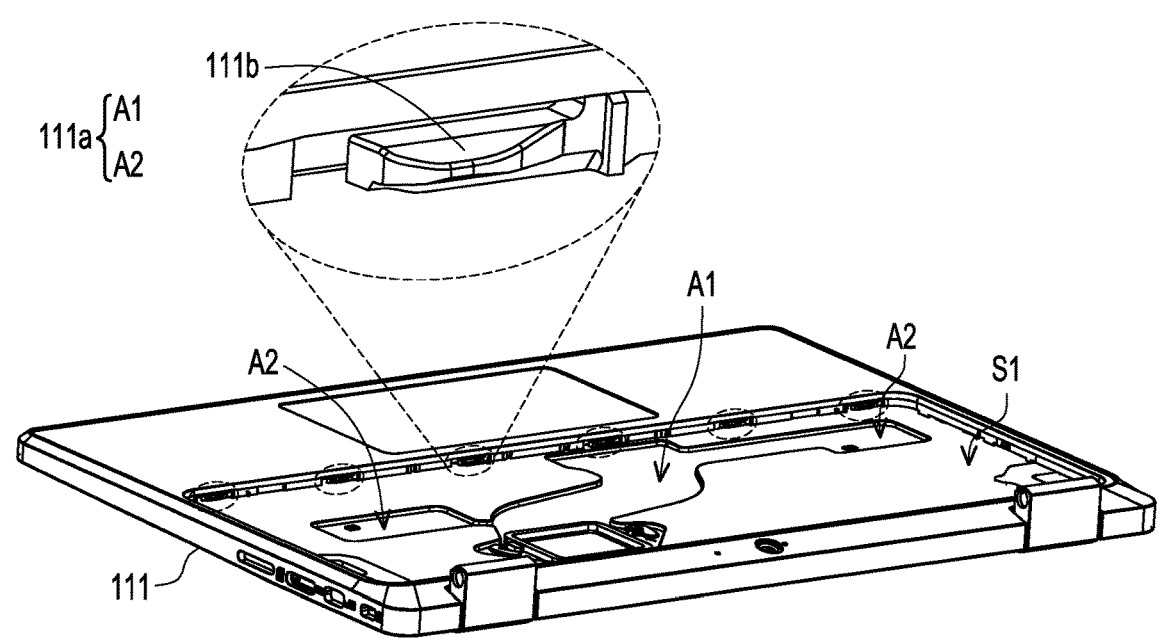
Figure 2D:
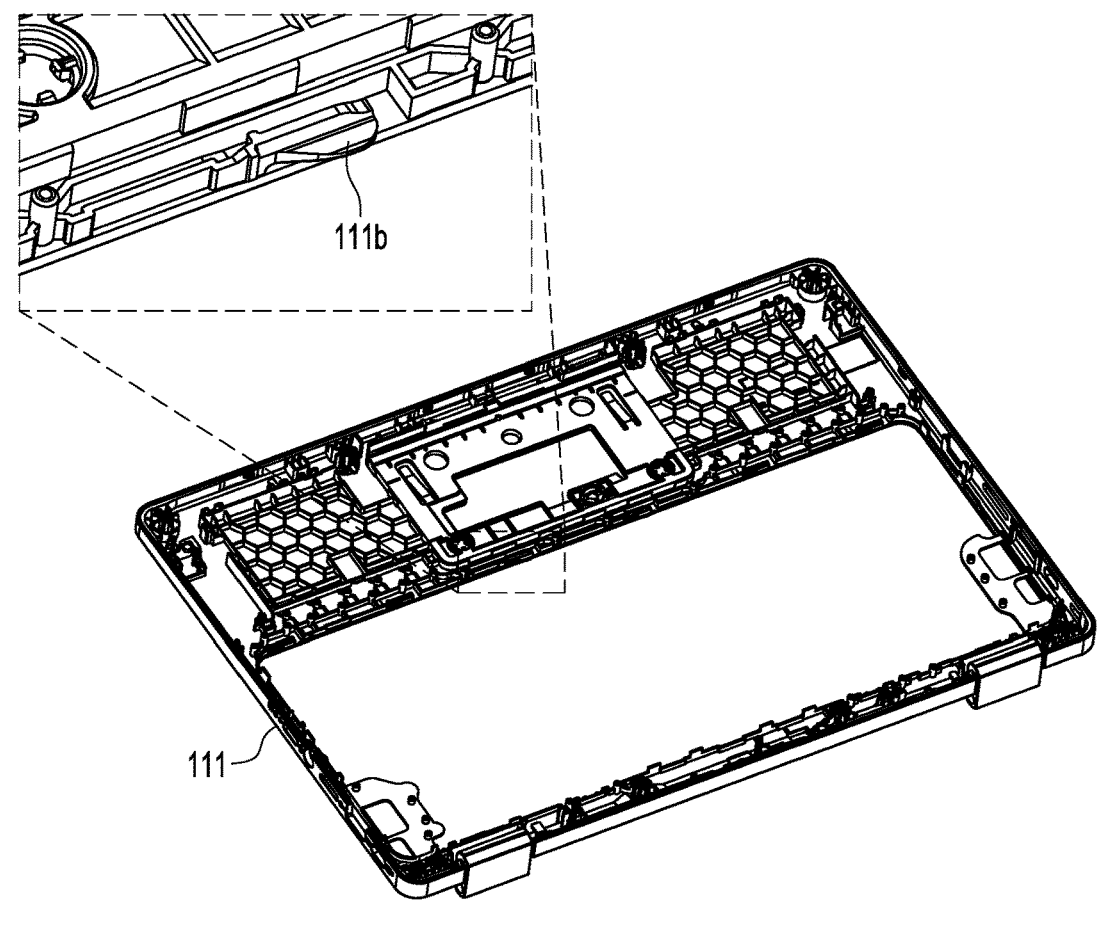
Figure 2E:
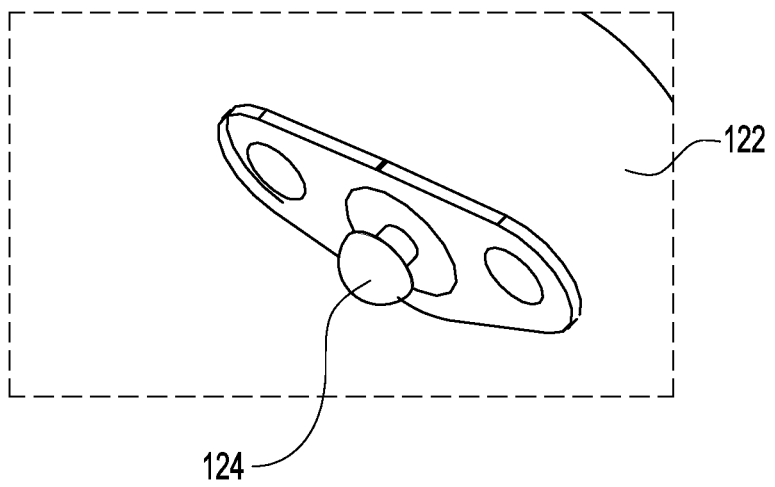
Figure 2F:
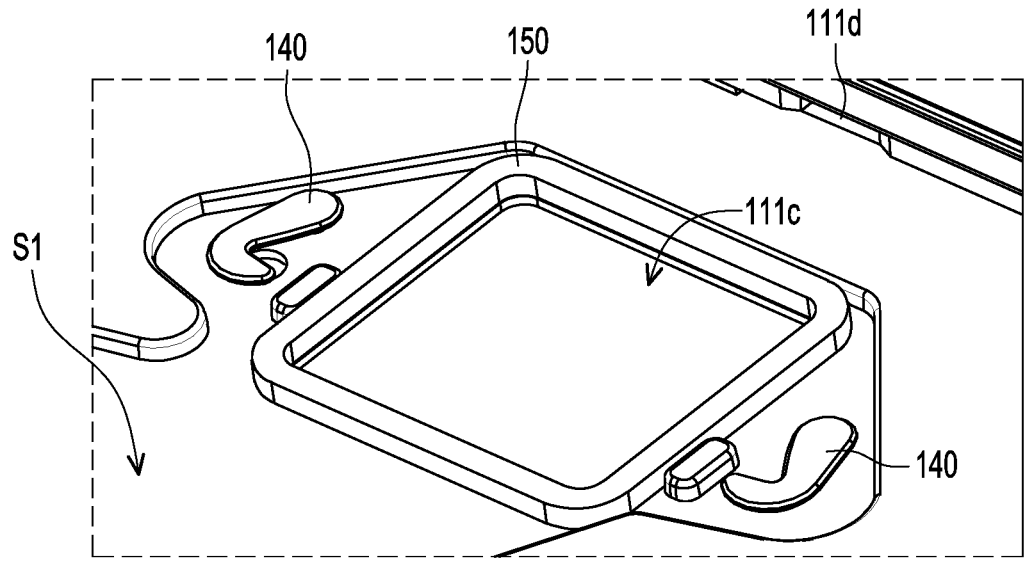

FIG. 2B to FIG. 2F are enlarged views of multiple parts of the laptop computer of FIG. 2A. FIG. 2E is an enlarged schematic view of a part A of FIG. 2A, and FIG. 2F is an enlarged schematic view of a part B of FIG. 2A. Referring to FIG. 2A while also taking FIG. 2B into consideration, the host 110 of this embodiment includes a first casing 111 and a second casing 112 assembled together. The first casing 111 has the first surface S1. The second casing 112 has the second surface S2. The keyboard 120 is assembled on the first casing 111. Two opposite side edges of the keyboard 120 have a locking hole 126 and a protrusion 125. Correspondingly, referring to FIG. 2A, FIG. 2C and FIG. 2D, the first casing 111 has an elastic locking arm 111*b* and a locking hole 111*d*. During the process of assembling the keyboard 120 to the first casing 111, the keyboard 120 is adapted to insert the protrusion 125 (as shown in FIG. 2B) into the locking hole 111*d* in a state of being inclined forward. Afterwards, the side edge having the locking hole 126 drops towards the first surface S1, so that the elastic locking arm 111*b* may be engaged with (and locked to) the locking hole 126. Furthermore, as shown in FIG. 2A, the keyboard 120 includes a key portion 121 and a baseplate 122 that are combined with each other. The assembled key portion 121 and the baseplate 122 form the locking hole 126. The protrusion 125 is equivalent to a part extending from the baseplate 122. Conversely, to remove the keyboard 120 from the first casing 111, the first casing 111 is firstly pressed to synchronously press the elastic locking arm 111*b* to withdraw the elastic locking arm 111*b* from the locking hole 126, then the keyboard 120 may be smoothly moved from the first casing 111 through a posture shown in FIG. 2A. It should be noted that this embodiment does not limit the number of the elastic locking arm 111*b*, the number of the locking hole 126, the number of 'the protrusion 125 and the number of the locking hole 111*d*. The numbers of these components may be increased or decreased according to the assembly requirements of the keyboard 120 and the first casing 111.

Figure 3:
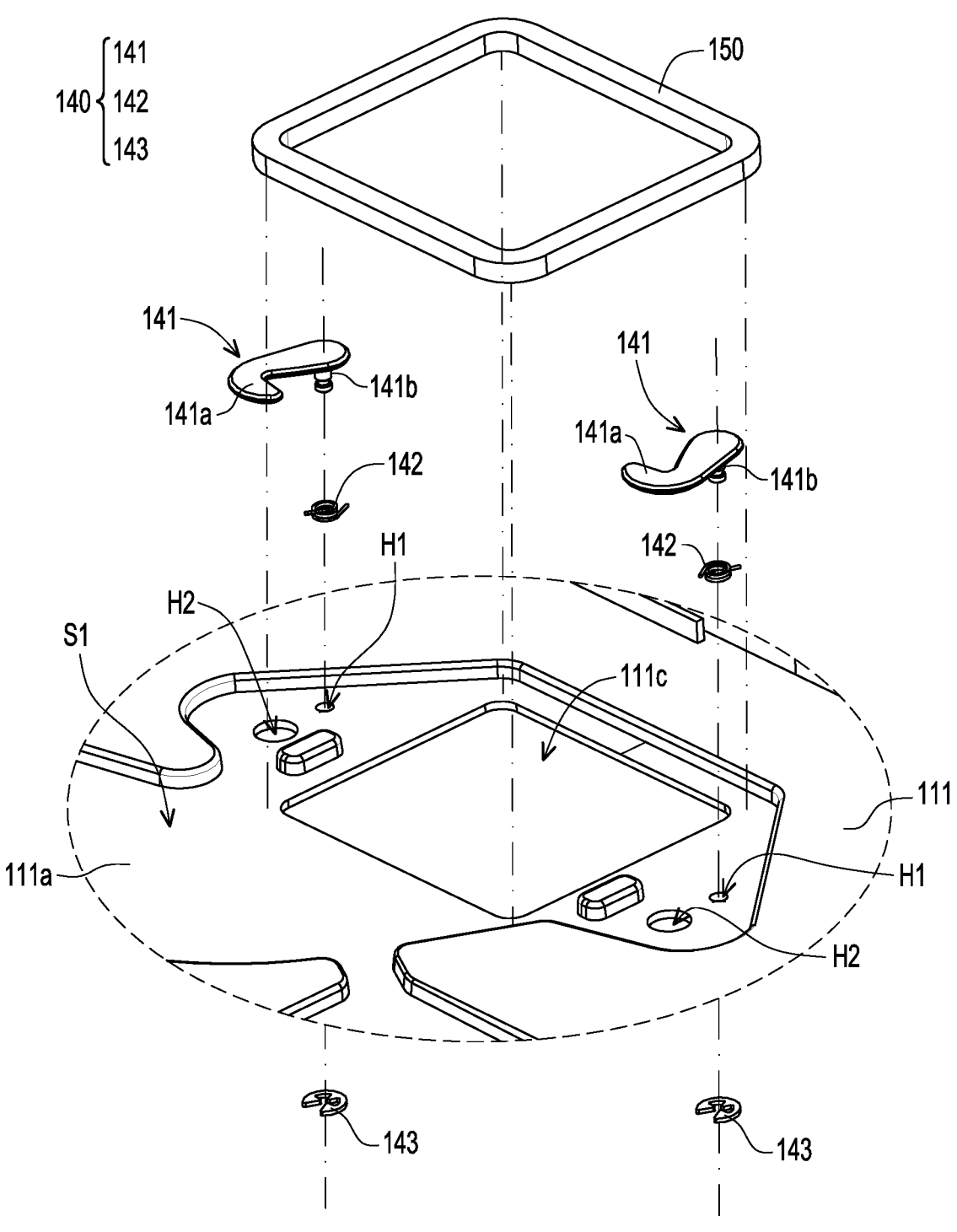
FIG. 3 is an exploded schematic view of a portion of the laptop computer of FIG. 2A.

FIG. 3 is an exploded schematic view of a portion of the laptop computer of FIG. 2A. Referring to FIG. 2E, FIG. 2F and FIG. 3 together, the host 110 has a movable hook 140, and the movable hook 140 is located on the first surface S1. The keyboard 120 has a locking column 124, so that when the keyboard 120 is disposed on the first surface S1, the locking column 124 is locked by the movable hook 140, so as to fix the keyboard 120 on the first surface S1. Furthermore, the first casing 111 further includes a third surface S3. The third surface S3 and the first surface S1 are two opposite surfaces of the first casing 111. The movable hook 140 includes a hook 141, a torsional spring 142 and a fastener 143. The hook 141 has a pivot column 141*b* and a hook portion 141*a*. The pivot column 141*b* is disposed in a pivot hole H1 of the first casing 111. The torsional spring 142 is sleeved on the pivot column 141*b* and abuts between the hook portion 141*a* and the first casing 111. The fastener 143, such as a C-shaped buckle, locks a portion of the pivot column 141*b* protruding from the third surface S3, so that the pivot column 141*b* may pivot relatively to the first casing 111 but not relatively move away (that is, the pivot column 141*b* may not be detached from the first casing 111 along a pivot axis thereof.). Therefore, the hook portion 141*a* is rotatably maintained on the first surface S1.

Figure 4A:
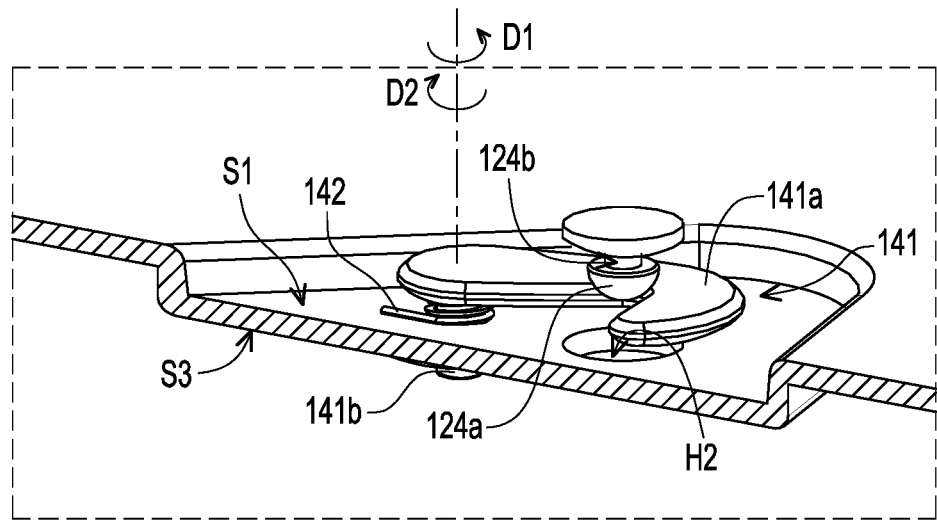
FIG. 4A and FIG. 4B are schematic views showing a movement of a locking column and a movable hook.
Figure 4B:
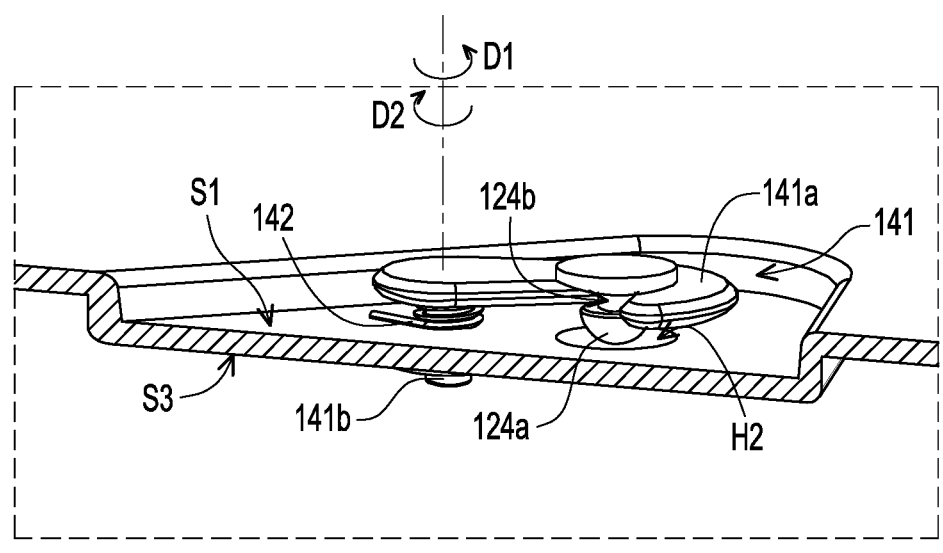
Figure 4C:
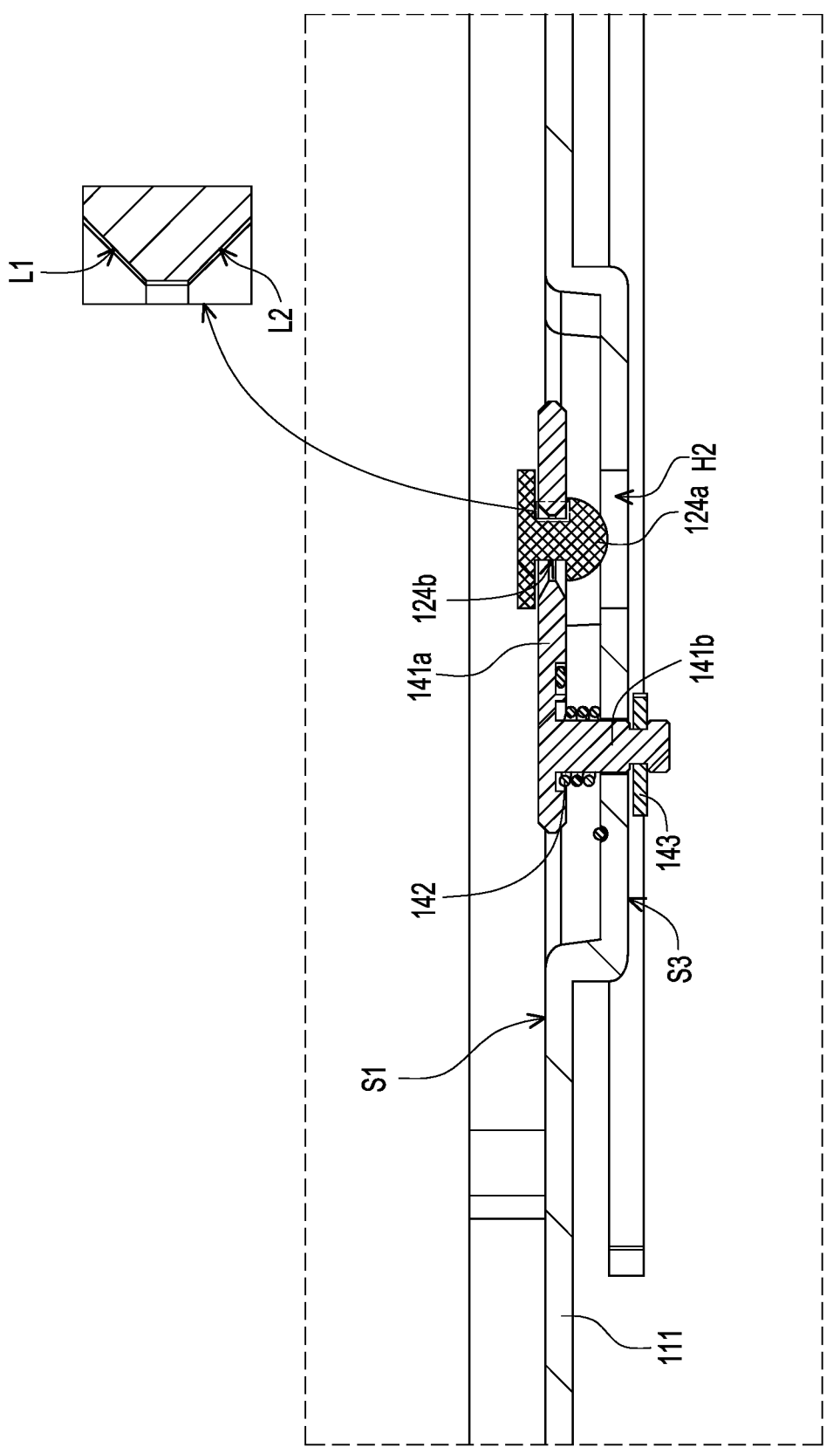
FIG. 4C is a partial cross-sectional view of the laptop computer in FIG. 2A.

FIG. 4A and FIG. 4B are schematic views showing a movement of a locking column and a movable hook. FIG. 4C is a partial cross-sectional view of the laptop computer in FIG. 2A. Most of the keyboard 120 is omitted here, and the locking column 124 extending from the baseplate 122 is used as an example to avoid overly complicated figures (that is, the locking column 124 is shown to represent the movement of the keyboard 120). Referring to FIGS. 4A to 4C together, the locking column 124 of this embodiment has a hemispherical portion 124*a* and a neck portion 124*b*. The neck portion 124*b* is connected between the baseplate 122 of the keyboard 120 and the hemispherical portion 124*a* (as shown in FIG. 2D). During the process of assembling the keyboard 120 to the first surface S1 of the host 110, when the hemispherical portion 124*a* passes the hook portion 141*a*, the hemispherical portion 124*a* presses the hook portion 141*a* to move (rotate) in a first direction D1 and deform the torsional spring 142. After the hemispherical portion 124*a* passes through the hook portion 141*a*, the torsional spring 142 drives the hook portion 141*a* to move (rotate) along a second direction D2 to lock the neck portion 124*b*. The first direction D1 is opposite to the second direction D2.

As shown in FIG. 4C, the hook portion 141*a* of this embodiment has a pair of inclined faces L1 and L2, respectively extending from two opposite surfaces of the hook portion 141*a*, and the inclined faces L1 and L2 are simultaneously located on a moving path of the hemispherical portion 124*a*. In other words, during the process from FIG. 4A to FIG. 4B, the hemispherical portion 124*a* may push against the inclined face L1 to push the hook portion 141*a* away, which facilitates the locking column 124 to fall into the first casing 111. Conversely, during the process from FIG. 4B to FIG. 4A, the hemispherical portion 124*a* pushes against the inclined face L2 to push the hook portion 141*a* away, which facilitates the locking column 124 to move away from the first casing 111. Furthermore, as shown in FIGS. 4A to 4C, or as shown in FIG. 3, the first casing 111 further includes an avoidance hole H2 communicating the first surface S1 and the third surface S3. The avoidance hole H2 is located on the moving path of the locking column 124. When the keyboard 120 is assembled to the first casing 111, part of the hemispherical portion 124*a* falls into the avoidance hole H2.

Referring to FIG. 2A, FIG. 2E and FIG. 3 again, in this embodiment, the first casing 111 further includes an opening 111*c* communicating the first surface S1 and the third surface S3. The laptop computer 100 further includes a circuit board assembly 113, disposed in the host 110 and located between the first casing 111 and the second casing 112. The keyboard 120 further includes a flexible electrical connecting member 123, such as a cable or a flexible circuit board. The flexible electrical connecting member 123 passes through the opening 111*c* from the first surface S1 and is electrically connected to an electrical connector 113*a* on the circuit board assembly 113. Moreover, the first casing 111 further includes a channel 111*a*. The channel 111*a* communicates with the opening 111*c* and is used to accommodate the flexible electrical connecting member 123. The host 110 of this embodiment has a pair of the movable hooks 140 substantially disposed in the channel 111*a* and located on two opposite sides of the opening 111*c*.

Furthermore, the laptop computer 100 further includes a buffering member 150 disposed on a periphery of the opening 111*c*. When the keyboard 120 is fixed on the first surface S1, the buffering member 150 is pressed between the keyboard 120 and the first casing 111 to isolate the opening 111*c* from the first surface S1. The flexible electrical connecting member 123 passes through the buffering member 150. The buffering member 150 is, for example, a gasket, which may effectively separate the first surface S1 and the third surface S3 of the first casing 111 into two independent spaces through the pressing effect, so as to prevent external dust or moisture from passing through the opening 111*c* and entering into the host 110. Furthermore, because the locking column 124 and the movable hook 140 are disposed in pairs on the two opposite sides of the opening 111*c* and also on two opposite sides of the flexible electrical connecting member 123, the buffering member 150 may be properly pressed to facilitate the isolation effect as required.

On the other hand, Referring to FIG. 2A again, in the laptop computer 100 of this embodiment, the channel 111*a* is further divided into a trunk A1 and two branches A2. The trunk A1 is used to accommodate the flexible electrical connecting member 123. The branch A2 has a lower topography than the trunk A1, so when water or liquid enters the keyboard 120, the water or liquid may be guided to the branch A2 and kept away from the trunk A1 accordingly. Furthermore, the second casing 112 of this embodiment further includes a water collecting tank 112*a* and a drainage hole 112*b*. The branch A2 further includes a water guide hole 111*e*, so the water or liquid guided to the branch A2 may smoothly flow to the water collecting tank 112*a*. Here, an inner bottom surface of the water collecting tank 112*a* is tilted to facilitate the water or liquid in the water collecting tank 112*a* to be discharged from the laptop computer 100 through the drainage hole 112*b*.

To sum up, in the embodiments of the disclosure, the host of the laptop computer has the first surface and the second surface opposite to each other. The second surface is used as a supporting surface when placed on the platform. The display is folded or unfolded relative to the first surface. The keyboard may be directly locked or released with the movable hook on the first surface through the locking column on the bottom surface. In this way, the keyboard of the laptop computer may be disassembled and assembled from the outside of the host without disassembling the host, thereby providing a simple and convenient assembly process.

What is claimed is:

1. A laptop computer with a quick-release keyboard, comprising:

a host, having a first surface and a second surface opposite to each other, wherein the host has at least one movable hook located on the first surface;

a display, pivoted to the host to be pivoted relative to the host and be folded and unfolded relative to the first surface of the host, wherein the laptop computer is adapted to be supported on a platform via the second surface in response to the display being unfolded relative to the first surface of the host; and a keyboard, having a locking column, wherein the locking column is locked by the movable hook in response to the keyboard being arranged on the first surface, such that the keyboard is fixed on the first surface, wherein the host comprises a first casing and a second casing combined with each other, the first casing has a third surface and the first surface opposite to each other, the second casing has the second surface, and the movable hook comprises:

a hook, having a pivot column and a hook portion, wherein the pivot column is disposed in the first casing;

a torsional spring, sleeved on the pivot column and abutting between the hook portion and the first casing, wherein the torsional spring constantly drives the hook to rotate toward the locking column; and a fastener, locking a portion of the pivot column protruding from the third surface, so that the pivot column is pivotable relatively to the first casing without relatively moving away, and the hook portion is rotatably maintained on the first surface.

2. The laptop computer with the quick-release keyboard according to claim 1, wherein the locking column has a hemispherical portion and a neck portion, the neck portion is connected between a baseplate of the keyboard and the hemispherical portion, and during a process of assembling the keyboard to the first surface of the host, in response to the hemispherical portion passing the hook portion, the hemispherical portion presses the hook portion to rotate and deform the torsional spring, and after the hemispheric portion passes through the hook portion, the torsional spring drives the hook portion to rotate to lock the neck portion.

3. The laptop computer with the quick-release keyboard according to claim 2, wherein the hook portion has a pair of inclined faces respectively extends from two opposite surfaces of the hook portion, and the pair of inclined faces are simultaneously located on a moving path of the hemispherical portion.

4. The laptop computer with the quick-release keyboard according to claim 1, wherein the first casing further comprises an opening communicating the first surface and the third surface, the laptop computer further comprises a circuit board assembly disposed in the host and located between the first casing and the second casing, and the keyboard further comprises a flexible electrical connecting member that passes through the opening from the first surface and is electrically connected to the circuit board assembly.

5. The laptop computer with the quick-release keyboard according to claim 4, further comprising a buffering member, disposed on a periphery of the opening, wherein in response to the keyboard being fixed on the first surface, the buffering member is pressed between the keyboard and the first casing to isolate the opening from the first surface, and the flexible electrical connecting member passes through the buffering member.

6. The laptop computer with the quick-release keyboard according to claim 4, wherein the first casing further comprises a channel that communicates with the opening and accommodates the flexible electrical connecting member, and the at least one movable hook comprises a pair of movable hooks that are disposed in the channel and located on opposite sides of the opening.

7. The laptop computer with the quick-release keyboard according to claim 1, wherein the first casing further comprises a plurality of locking holes and a plurality of elastic locking arms, two opposite sides of the keyboard further comprise a plurality of protrusions and a plurality of locking holes, and through locking the protrusions to the locking holes and locking the elastic locking arms to the locking holes, the keyboard is fixed on the first surface.

8. The laptop computer with the quick release keyboard according to claim 1, further comprising a circuit board assembly, wherein the host has a pair of the movable hooks, the first casing further comprises an opening, the keyboard further comprises a flexible electrical connecting member, the flexible electrical connecting member passes through the opening from the first surface and is electrically connected to the circuit board assembly, and the pair of movable hooks are located on opposite sides of the flexible electrical connecting member.

9. The laptop computer with the quick-release keyboard according to claim 2, wherein the first casing further comprises an avoidance hole communicating the first surface and the third surface, and the avoidance hole is located on a moving path of the locking column.

* * * * *